United States Patent [19]
Argiolas

[11] Patent Number: 5,956,032
[45] Date of Patent: Sep. 21, 1999

[54] SIGNALLING A USER ATTEMPT TO RESIZE A WINDOW BEYOND ITS LIMIT

[75] Inventor: Andrea Argiolas, Monserrato, Italy

[73] Assignee: International Business Machines Corporation, Armonk, N.Y.

[21] Appl. No.: 08/859,949

[22] Filed: May 21, 1997

[30] Foreign Application Priority Data

Jun. 10, 1996 [GB] United Kingdom .................. 9612089

[51] Int. Cl.⁶ ...................................................... G06F 3/14
[52] U.S. Cl. ........................... 345/342; 345/340; 345/349; 345/145
[58] Field of Search .................................... 345/342, 340, 345/343, 145, 157, 348, 339, 349

[56] References Cited

U.S. PATENT DOCUMENTS 5,227,771   7/1993   Kerr et al. ............................... 345/340
5,237,653   8/1993   Noguchi et al. ..................... 345/340 X
5,487,143   1/1996   Southgate ................................. 345/342
5,621,904   4/1997   Elliott et al. ............................. 345/342
5,649,132   7/1997   Fumarolo et al. ....................... 345/342
5,821,931   10/1998  Berquist et al. ..................... 345/342 X

FOREIGN PATENT DOCUMENTS 0 274 087   7/1988   European Pat. Off. .

*Primary Examiner*—Raymond J. Bayerl
*Attorney, Agent, or Firm*—Jeanine S. Ray-Yarletts

[57] ABSTRACT

In a graphical user interface, a method for resizing the windows which visually indicates to the user that an illegal resizing action is attempted. A graphical icon provides an immediately and intuitively perceivable feedback of the forbidden attempt.

10 Claims, 3 Drawing Sheets

A                B

C                D

SIGNALLING A USER ATTEMPT TO RESIZE A WINDOW BEYOND ITS LIMIT

TECHNICAL FIELD

The present invention relates to a graphical user interface and particularly to a method and system for resizing windows.

BACKGROUND OF THE INVENTION

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

It is usually possible to simultaneously execute several software applications. The execution of multiple applications simultaneously is often referred to as "multitasking". It is desirable in such environments to allow the user to view some or all of the applications simultaneously. This is often accomplished by the utilization of the concept of "windows" wherein all or part of multiple applications are displayed in separate viewports of a computer system video display system. It is known to have multiple software applications present on a computer display simultaneously, one or more of which may be active at any given time, and which may be displayed in a window or icon.

There may be several windows simultaneously present on the desktop with each window displaying information that is generated by a different application program. Each application program presents information to the user through its window by drawing images, graphics or text within the window region. The user, in turn, communicates with the application by pointing at graphical objects in the window with a pointer that is controlled by a pointing device, such as a mouse, and then selecting the objects, or by typing information via a keyboard associated with the monitor. Selection of the objects may be effected by actuating the mouse to move the pointer onto or near the objects and pressing and quickly releasing, i.e. clicking, a button on the mouse, or by manipulating a cursor via the keyboard.

These user interface objects may be easily manipulated utilizing a standard set of interface commands. For example, the user may move the windows around on the display screen, change their sizes and appearances, shrink down a window to a so-called icon, rearrange the objects with respect to their relative background/foreground position so as to arrange the desktop in a convenient manner, etc.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

As mentioned above one of the possible operations a user can perform on a window is to change its size. This is usually accomplished by placing the cursor, using the mouse or any pointer device, on a side or on a corner of the window, "dragging" the border, i.e. associating the border of the window to the cursor so that the moving of the cursor will cause the border to move, and moving the side or the corner of the window causing the window to resize accordingly.

Of course when the window has reached its maximum or minimum limit, the border (either through a side or a corner) cannot be moved further. The known graphical user interfaces have the drawback that there is no signal to the user which clearly informs of the impossibility of further resizing in that direction. So there is no way for the user to immediately understand he is trying an impossible operation. The only feedback the system provides to the user is that nothing happens while the user tries the resizing. This could be misleading because it is quite easy to "miss" the window border during the dragging operation; it so highly probable that the user will try again repeatedly before being sure the limit size has been reached.

It is an object of the present invention to provide a technique which alleviates the above drawbacks.

SUMMARY OF THE INVENTION

According to the invention we provide in a graphical user interface for graphically displaying a plurality of windows on a display area, having a cursor movable on the display area via a pointing device, each window having along at least one direction a predetermined maximum and a predetermined minimum size limit, a method for resizing a window, comprising the following steps:

associating a part of the border of the window with the cursor;

moving that part of the border by moving the cursor on the display area, thereby effecting a change in the size of the windows;

responsive to an attempt of moving the border beyond at least one of said limits, emitting a signal to the user to indicate that said predetermined maximum or minimum size limit has been reached.

Further, according to the present invention we provide, in a data processing system, a graphical user interface for displaying on a display area a plurality of windows, each window having along at least one direction a predetermined maximum and a predetermined minimum size limit, the graphical user interface comprising:

a cursor movable on the display area;

pointing means for moving the cursor on the display area;

means for associating a part of the border of a window with the cursor;

means for resizing the window by moving the cursor on the desktop;

characterized in that it further comprises means, responsive to an attempt of moving the border beyond at least one of said limits, for emitting a signal to the user to indicate that said predetermined maximum or minimum size limit has been reached.

BRIEF DESCRIPTION OF THE DRAWINGS

Various embodiments of the invention will now be described in detail by way of examples, with reference to accompanying figures, where.

DETAILED DESCRIPTION OF THE PREFERRED EMBODIMENT

Figure 1:
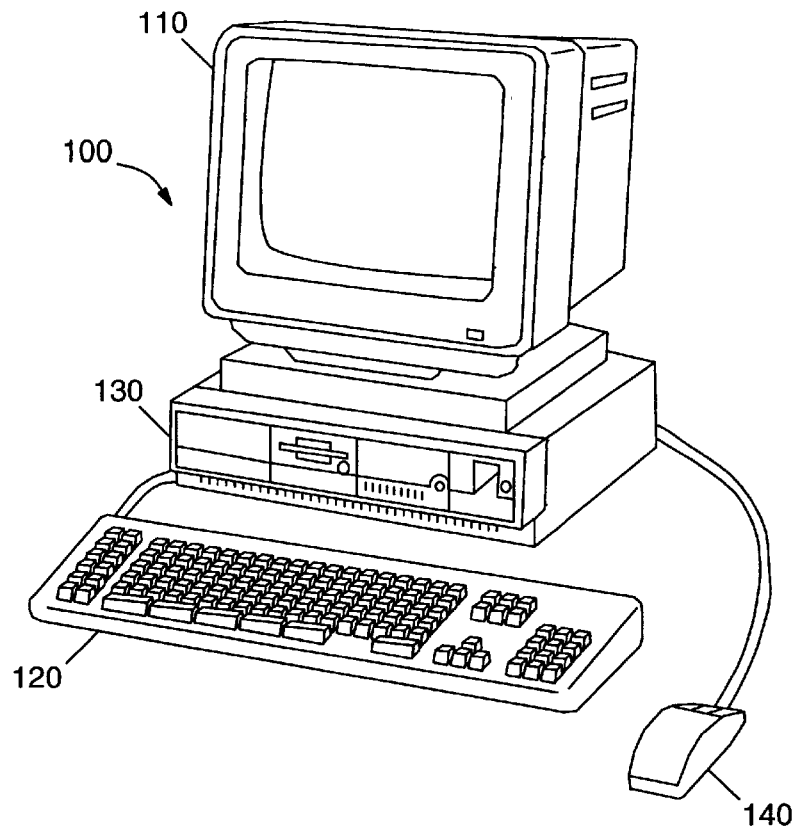
FIG. 1 shows schematically a computer which may be utilized to implement the method and system of the present invention.

With reference to FIG. 1, there is depicted a computer 100 which may be utilized to implement the method and system of the present invention. The computer 100 preferably includes a display unit 110 and a keyboard 120, coupled in a manner well known in the art. Additionally, the computer 100 includes a processor system unit 130 which may serve to mount a fixed disk drive and a diskette drive in addition to the main processor and memory. Further, in order to facilitate the utilization of a graphical user interface, computer 100 preferably includes a graphic pointing device, such as a mouse 140, which may be utilized to manipulate the position of a pointer (not shown) within a visual display on the screen 110. Those skilled in the art will appreciate that computer 100 may be implemented utilizing any state-of-the-art personal computer, such as the PS/2 Personal Computer manufactured by International Business Machines Corporation. (PS/2 is a trademark of International Business Machines Corporation).

Figure 2:
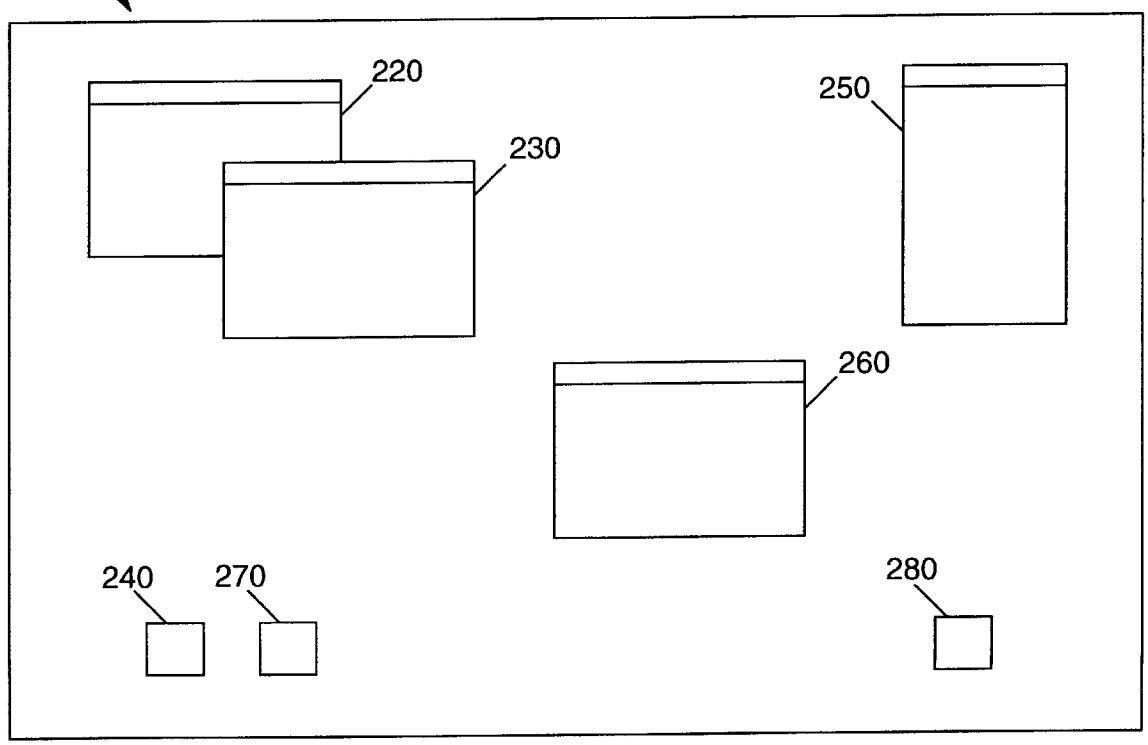
FIG. 2 shows schematically a graphical user interface of the type used in the preferred embodiments of the present invention.

With regard now to FIG. 2, a graphical user interface which may be utilized to implement the method and system of the present invention is shown. The graphical display is typically arranged to resemble a single desktop 210. Execution of an application program involves one or more user interface objects represented by windows 220, 230 and icons 240. Typically, there may be several other windows 250, 260 and icons 270, 280 simultaneously present on the desktop and displaying information that is generated by different applications.

The window environment is generally part of the operating system software that includes a collection of utility programs for controlling the operation of the computer system 100. The operating system, in turn, interacts with application programs to provide higher level functionality, including a direct interface with the user. Specifically, the application programs make use of operating system functions by issuing task commands to the operating system which then performs the requested task. For example, an application program may request that the operating system display certain information on the window 220 for presentation to the user. More details about (as an example) one of these window oriented operating systems (Windows operating system available from Microsoft) can be found in "Programming Windows" by Charles Petzold, from Microsoft Press.

As mentioned above one of the possible actions a user can perform in a multi-window environment, is to change the size of a window. In a preferred embodiment this resizing action is performed by acting on the cursor which is controlled by a pointing device such as a mouse. The cursor is placed on a point of the window border (either a corner or a side) and the border is "hooked" to the cursor, so that by moving the cursor through the pointing device, the border is "dragged" and the window changes its size accordingly.

Figure 3:
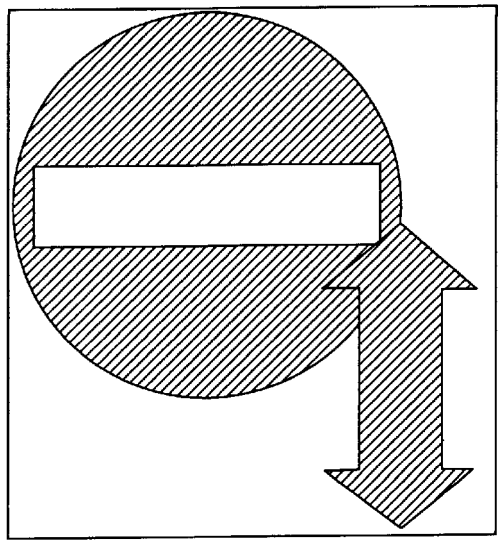
FIG. 3 is a schematic example of visual signals according to a preferred embodiment of the present invention.
Figure 3:
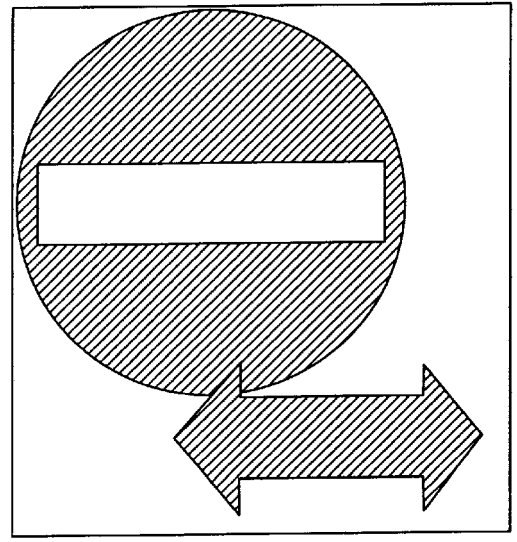
Figure 3:
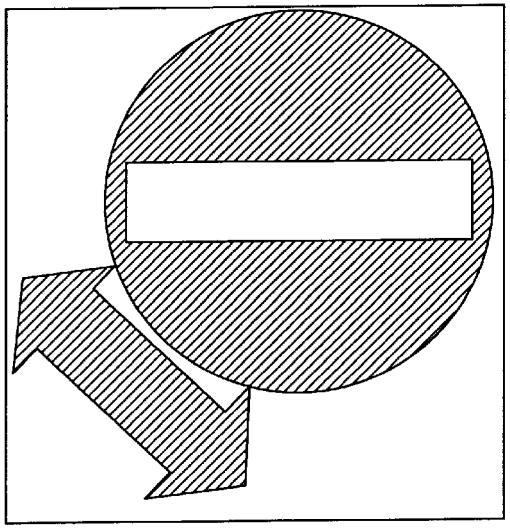
Figure 3:
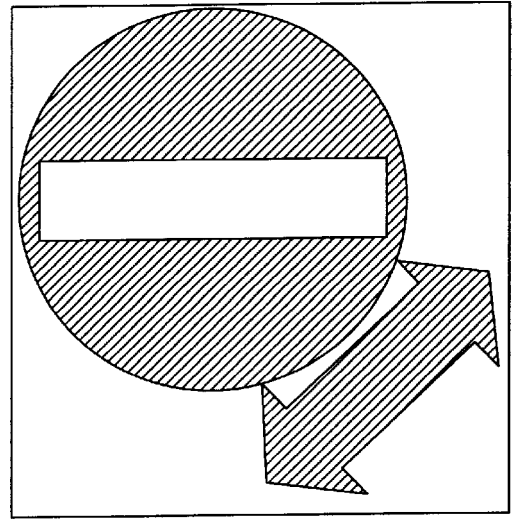

According to the preferred embodiment of the present invention a visual signal is provided to the user which indicates that the window has reached a maximum or a minimum size limit on the direction the resizing is attempted. In FIG. 3 examples of such visual feedback are shown: they imitate a forbidden traffic action. FIG. 3a indicates a forbidden attempt to resize a window along its vertical axis; FIG. 3b is a feedback for a forbidden resizing along the horizontal axis; FIGS. 3c and 3d indicate a forbidden attempt along the diagonal directions when the window border is dragged through one of its corners. Of course these are only examples of icons used to visually signal the forbidden action; other kinds of visual signals can be used. Also signals of different nature can be used in substitution of the visual ones or in addition to them (e.g. a sound signal). Those skilled in the art will appreciate that any kind of the above mentioned signal can be easily implemented in the Graphical User Interface of the existing operating systems.

Figure 4:
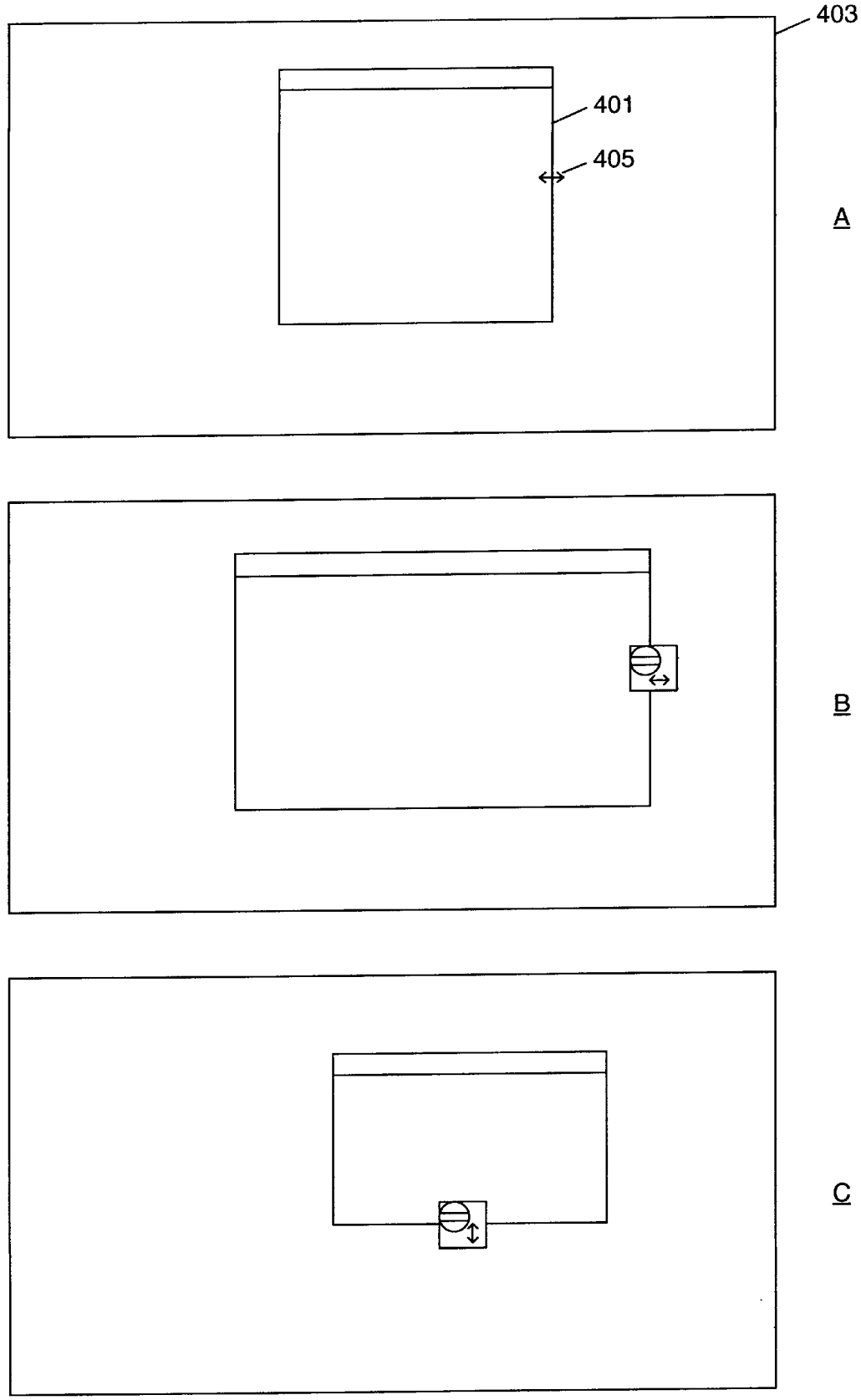
FIG. 4 is a schematic example of the method according to a preferred embodiment of the present invention.

FIG. 4 shows some examples of the resizing action according to the preferred embodiment. FIG. 4a represents a window 401 on the desktop 403. Icon 405 indicates that a resizing action along the horizontal axis is being performed by the user: the cursor changed its appearance to indicate this action.

FIG. 4b shows the same window 401 after the maximum right-hand size has been reached and a further resizing action in that direction is attempted. In such case, according to a preferred embodiment, the cursor icon changes to indicate the impossibility of such action: the icon of FIG. 3b is displayed.

In FIG. 4c the window 401 reached its minimum size on the vertical axis and the icon indicates that a further resizing on the vertical direction is forbidden. The cursor icon visually shows this prohibition by displaying the icon of FIG. 3a.

These visual feedbacks allow the user to immediately and intuitively perceive that an impossible action is attempted and to avoid useless and time consuming further attempts.

I claim:

1. In a graphical user interface for graphically displaying a plurality of windows on a display area, having a cursor movable on the display area via a pointing device, each window having along at least one direction a predetermined maximum and a predetermined minimum size limit, a method for resizing a window, comprising the following steps:

associating a part of the border of the window with the cursor;

moving that part of the border by moving the cursor on the display area, thereby effecting a change in the size of the windows;

responsive to an attempt of moving the border beyond at least one of said limits, emitting a signal to the user to indicate that said predetermined maximum or minimum size limit has been reached.

2. The method of claim 1 wherein the signal comprises a visual signal.

3. The method of claim 2 wherein the visual signal imitates a forbidden traffic action.

4. The method of claim 2 wherein, responsive to an attempt of moving the border beyond at least one of said limits, the cursor is substituted by the visual signal.

5. The method of claim 1 wherein the signal comprises an acoustic signal.

6. The method of claim 1, wherein said part of the border of the window is any of the sides of the window.

7. The method of claim 1 wherein said part of the border of the window is any of the corners of the window.

8. In a data processing system, a graphical user interface for displaying on a display area a plurality of windows, each window having along at least one direction a predetermined maximum and a predetermined minimum size limit, the graphical user interface comprising:

a cursor movable on the display area;

pointing means for moving the cursor on the display area;

means for associating a part of the border of a window with the cursor;

means for resizing the window by moving the cursor on the desktop;

characterized in that it further comprises means, responsive to an attempt of moving the border beyond at least one of said limits, for emitting a signal to the user to indicate that said predetermined maximum or minimum size limit has been reached.

9. The user interface of claim 8 wherein the signal comprises a visual signal.

10. The user interface of claim 9 wherein the visual signal imitates a forbidden traffic action.

* * * * *